(12) United States Patent
Nishikawa et al.

(10) Patent No.: US 7,909,114 B2
(45) Date of Patent: Mar. 22, 2011

(54) DRILLING DEVICE

(75) Inventors: Tomomasa Nishikawa, Hitachinaka (JP); Kenji Kobori, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 329 days.

(21) Appl. No.: 12/035,711

(22) Filed: Feb. 22, 2008

(65) Prior Publication Data

US 2008/0202781 A1 Aug. 28, 2008

(30) Foreign Application Priority Data

Feb. 23, 2007 (JP) ............................. P2007-043833
Feb. 23, 2007 (JP) ............................. P2007-043834
Feb. 23, 2007 (JP) ............................. P2007-043835

(51) Int. Cl.
*B23Q 11/00* (2006.01)
*B25D 17/00* (2006.01)

(52) U.S. Cl. ............. 173/75; 173/198; 408/67; 408/110

(58) Field of Classification Search ............ 173/75, 173/198, 197, 201, 171, 217; 408/67, 110, 408/58, 241 S
See application file for complete search history.

(56) References Cited

U.S. PATENT DOCUMENTS

| | | | | |
|---|---|---|---|---|
| 3,511,322 A * | 5/1970 | Holman et al. | | 173/75 |
| 4,192,390 A * | 3/1980 | Wanner et al. | | 173/75 |
| 5,113,951 A * | 5/1992 | Houben et al. | | 173/75 |
| 5,199,501 A * | 4/1993 | Kluber et al. | | 173/75 |
| 5,467,835 A * | 11/1995 | Obermeier et al. | | 175/209 |
| 6,575,254 B2 * | 6/2003 | Bongers-Ambrosius et al. | | 173/201 |
| 6,615,930 B2 * | 9/2003 | Bongers-Ambrosius et al. | | 173/198 |
| 6,851,898 B2 * | 2/2005 | Ege et al. | | 408/67 |
| 6,951,439 B2 * | 10/2005 | Arich | | 408/67 |
| 7,017,680 B2 * | 3/2006 | Arich et al. | | 173/198 |
| 7,281,886 B2 * | 10/2007 | Stoerig | | 408/67 |
| 7,325,273 B2 * | 2/2008 | Thanner et al. | | 15/344 |
| 7,354,226 B2 * | 4/2008 | Britz | | 408/67 |

FOREIGN PATENT DOCUMENTS

JP 2-43115 3/1990
JP 7-73817 3/1995

* cited by examiner

*Primary Examiner* — Scott A. Smith
(74) *Attorney, Agent, or Firm* — Antonelli, Terry, Stout & Kraus, LLP.

(57) ABSTRACT

A drilling device includes an end cutting tool, a main housing, a motor, a transmission, and a dust collection unit. The end cutting tool processes a workpiece. The motor is provided in the main housing for generating a torque. The transmission transmits the torque to rotate the end cutting tool. The dust collection unit collects dust generated by the rotation of the end cutting tool. The dust collection unit includes a dust case for accumulating the dust therein. The dust case is detachable from the main housing and has an inlet and an outlet. The inlet and the outlet are oriented in a single direction.

11 Claims, 6 Drawing Sheets

DRILLING DEVICE

TECHNICAL FIELD

The present invention relates to a drilling device that has a motor for rotating a drill tip to form a hole in a workpiece such as a brick or a concrete block. More particularly, the invention relates to a drilling device that has a dust-collection mechanism for collecting dust generated by the drilling.

BACKGROUND

A drill tool, a hammer drill (having a rotating hammer), and a vibrating drill have been used as drilling devices for forming a hole in a workpiece as a brick and a concrete block. The drilling device generates dust during the operation. A user therefore wears a dust mask and goggles, while using the drilling device.

To suppress the generation of dust during the drilling operation, thereby to improve the work environment, a drilling device has been provided with a dust-collection mechanism. The dust-collection mechanism includes a housing and a dust-collection fan provided in the housing. The drilling device has a dust-collection pipe and a dust-collection adapter. The dust-collection pipe is connected to the housing and can slide with respect thereto. The dust-collection adapter is positioned near the drill tip. When the fan is driven, dust is drawn and collected through the dust-collection adapter and the dust-collection pipe into the housing.

SUMMARY

An object of the present invention is to provide a drilling device to which a dust collection case can be easily secured in a simple manner.

Another object of the present invention is to provide a drilling device in which a dust collection case can be easily sealed to a main unit.

Another object of the present invention is to provide a drilling device that has a higher dust collection efficiency and a higher operating efficiency.

Still another object of the present invention is to provide a drilling device that includes a main unit, a dust-collection device, and a dust collection case which is removably and firmly attached to the main unit or the dust-collection device.

Another object of the present invention is to provide a drilling device in which a dust collection case is firmly sealed to a main unit, preventing dust from leaking out of the dust collection case.

The present invention provides a drilling device including an end cutting tool, a main housing, a motor, a transmission, and a dust collection unit. The end cutting tool processes a workpiece. The motor is provided in the main housing for generating a torque. The transmission transmits the torque to rotate the end cutting tool. The dust collection unit collects dust generated by the rotation of the end cutting tool. The dust collection unit includes a dust case for accumulating the dust therein. The dust case is detachable from the main housing and having an inlet and an outlet. The inlet and the outlet are oriented in a single direction.

The present invention provides a drilling device including an end cutting tool, a motor, a transmission, a dust collection unit, a dust collection adapter, and a support member. The end cutting tool processes a workpiece. The end cutting tool having an axis. The motor generates a torque. The transmission transmits the torque to rotate the end cutting tool. The dust collection unit collects dust generated by the rotation of the end cutting tool. The dust collection adapter is provided in proximity to the end cutting tool. The dust collection adapter is movable in an axial direction of the end cutting tool. The support member supports the dust collection adapter. The support member is retractable at a plurality of stages in the axial direction.

The present invention provides a drilling device including an end cutting tool having an axis, a main housing, a motor, a transmission, and a dust case. The motor is provided in the main housing for generating a torque. The transmission transmits the torque to rotate the end cutting tool. The dust case accumulates dust generated by the rotation of the end cutting tool. The dust case is detachable from the main housing. The dust case has a center of gravity. The dust case includes a first engaging portion and a second engaging portion to be engaged with the main housing, respectively. The first and second engaging portions are positioned on an imaginary line connecting the first and second engaging portions through the center of gravity.

BRIEF DESCRIPTION OF THE DRAWINGS

The particular features and advantages of the invention as well as other objects will become apparent from the following description taken in connection with the accompanying drawings, in which.

DETAILED DESCRIPTION

A drilling device according to an embodiment of the present invention will be described with reference to FIGS. 1 and 2. The expressions "front", "rear", "above" and "below" are used throughout the description to define the various parts when the drilling device is disposed in an orientation in which it is intended to be used.

Figure 1:
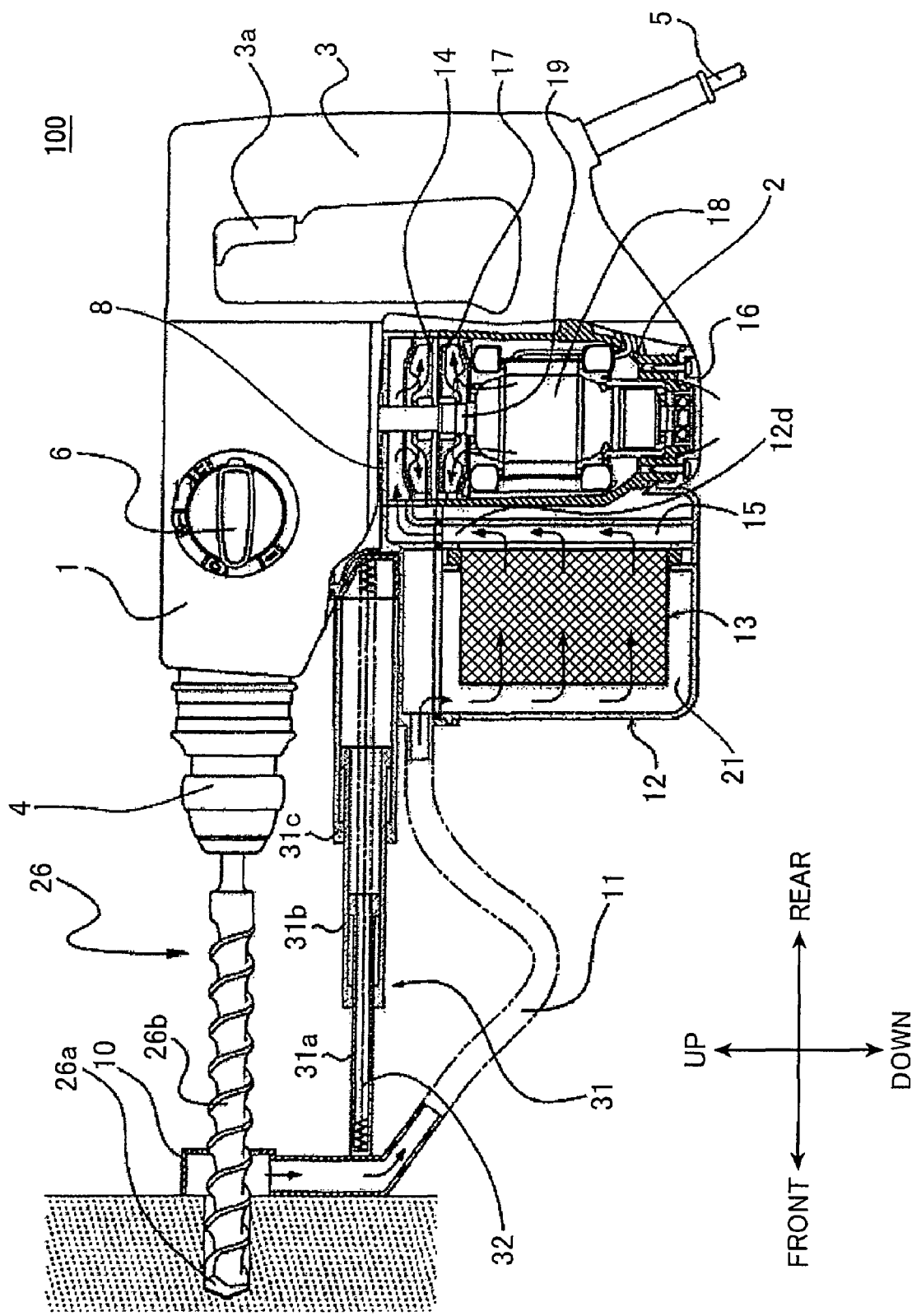
FIGS. 1 and 2 are partially sectional views illustrating a hammer drill according to one embodiment of the present invention.

FIG. 1 shows a hammer drill 100 according to the present invention. The hammer drill 100 includes a gear housing 1, a motor housing 2, a handle 3, a drill-tip holding unit 4, and a dust-collection mechanism. The drill-tip holding unit 4 detachably supports a drill tip 26.

The hammer drill is configured to operate in at least three modes. These modes include a rotating-hammering mode, a rotating mode, and a hammering mode. In the rotating-hammering mode, the hammer drill 100 rotates and strikes the drill tip 26. In the rotating mode, the hammer drill 100 rotates the drill tip 26. In the hammering mode, the hammer drill 100 strikes the drill tip 26. A switching member 6 is provided on one side of the gear housing 1. When operated, the switching member 6 activates the mode-switching mechanism provided in the gear housing 1. The mode-switching mechanism switches the operating mode of the hammer drill, from one to another. The hammer drill rotates and/or strikes the drill tip 26 to perform drilling. As the drill tip 26 performs drilling, the hammer drill is vibrated. More precisely, the hammer drill is vibrated as the drill tip 26 is moved back and forth repeatedly.

The handle 3 has one end connected to the gear housing 1 and the other end connected to the motor housing 2. The handle 3 has a power switch 3a and a power-supply cord 5.

The motor housing 2 contains a motor 18 that has a shaft 19. A cooling fan 17 is mounted on and secured to the shaft 19 of the motor 18. When the motor 18 is driven, rotating the cooling fan 17, cooling-air flows into the motor housing 2 through the air-inlet port (not shown) formed in the tail cover 16 of the motor housing 2. The cooling-air cools the motor 18 as the cooling-air passes by the motor 18. The cooling-air then flows out of the motor housing 2 through the air-outlet port (not shown).

The drill tip 26 includes a tip section 26a and a helical section 26b. The drill tip 26 cuts the workpiece and forms a hole in the workpiece, as the drill slip this rotated by the motor 18.

The dust-collection mechanism has a dust-collection housing 8 as a main unit that is composed of two sections. The first section is interposed between the gear housing 1 and the motor housing 2. The second section extends in the gap between the motor housing 2 and the drill tip 26. As shown in FIG. 2, the dust-collection housing 8 has a first opening 8a, a second opening 8b, a third opening 8c, and a recess 8d.

In the dust-collection housing 8, a dust-collection fan 14 is mounted on the shaft 19 of the motor 18, and can rotate integrally with the shaft 19. As the motor 18 rotates to rotate the dust-collection fan 14, air flows into the dust-collection housing 8 through the third opening 8c and flows to the outside from the dust-collection housing 8 through an air-outlet port (not shown).

Figure 2:
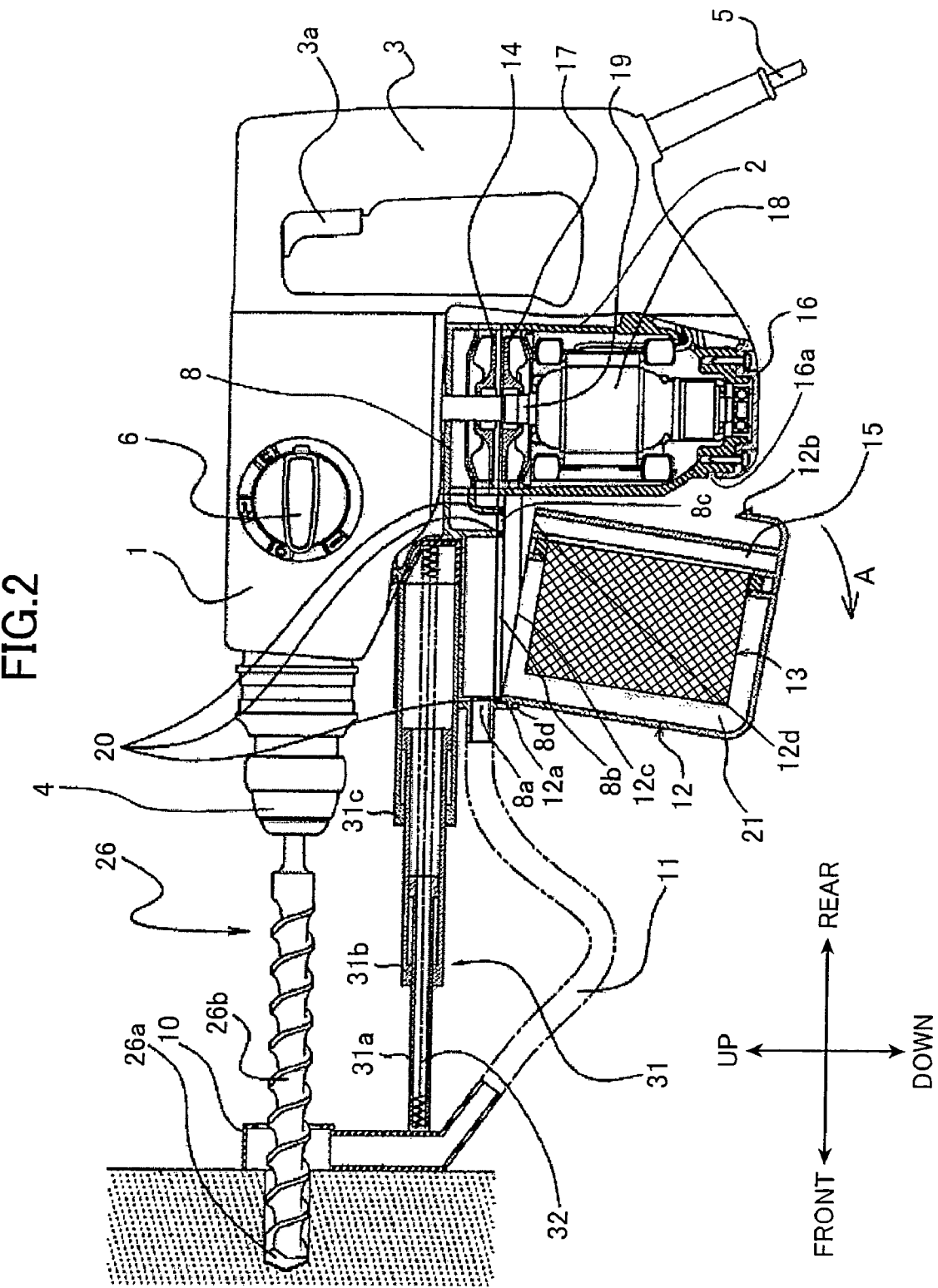
Figure 4:
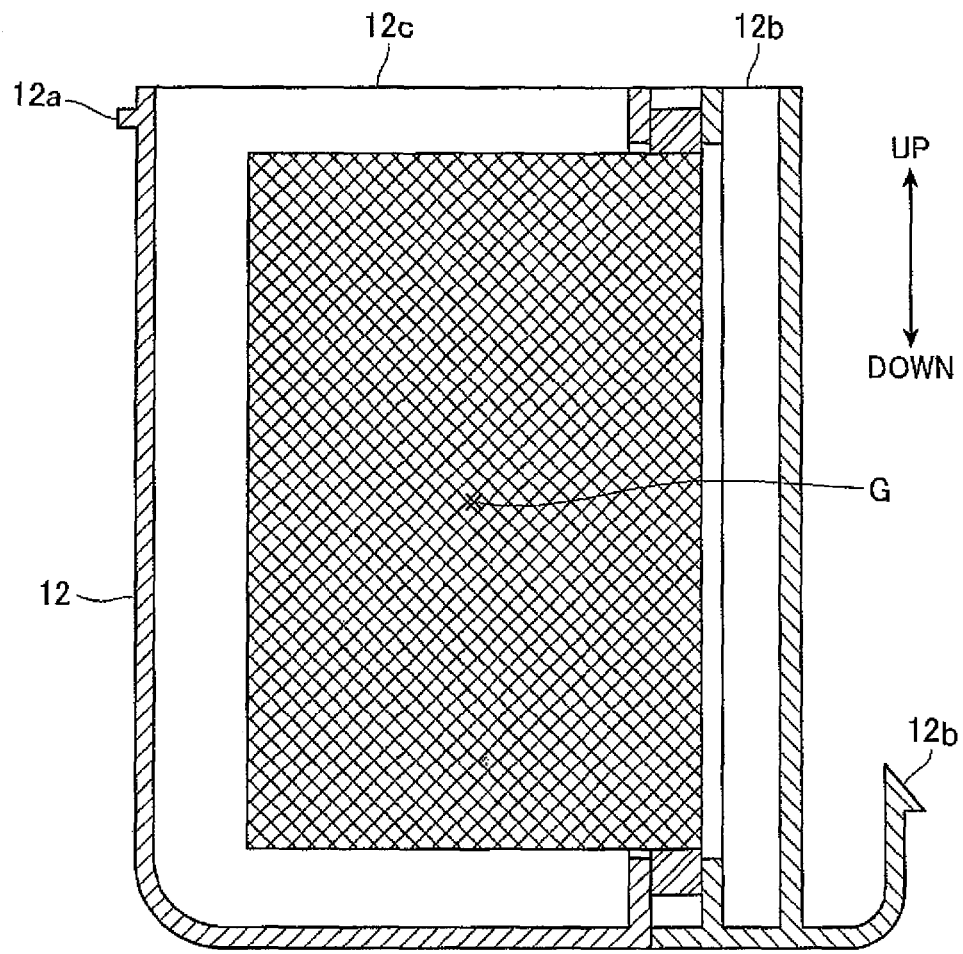
FIG. 4 is a vertically sectional view showing a dust collection case.

As shown in FIGS. 2 and 4, the dust collection case 12 has a projection 12a and a latch part 12b. The projection 12a can be fitted in the recess 8d of the dust-collection housing 8. The latch part 12b can be fitted in a recess 16a formed in the tail cover 16.

The projection 12a and the latch part 12b are provided on an imaginary line passing through the center of gravity G of the dust collection case 12.

The latch part 12b of the dust collection case 12 is engaged in the recess 16a of the dust collection housing 8. The projection 12a of the dust collection case 12 is engaged in the recess 8d of the dust collection housing 8.

When the projection 12a and the latch part 12b are disengaged from the recesses 8d and 16a, respectively, the dust collection case 12 is removed from the dust collection housing 8.

The first opening 12c of the dust collection case 12 is formed in the top surface of the dust collection case 12. The second opening 8b of the dust-collection housing 8 and the first opening 12c of the dust collection case 12 are communicated with each other. Further, the third opening 8c of the dust-collection housing 8 and the second opening 12d of the dust collection case 12 are communicated with each other. The first opening 12c of the dust collection case 12 is an inlet port through which air and dust enter the dust collection case 12. The second opening 12d of the dust collection case 12 is an outlet port through which air comes out of the dust collection case 12.

A seal member 20 is provided between the dust collection housing 8 and the dust collection case 12. The seal member 20 is in contact with the top surface of the dust collection case 12 and can be deformable in the direction in which the dust collection case 12 is attached to the dust collection housing 8.

The seal member 20 seals the gap between the rim of the second opening 8b of the dust-collection housing 8 and the rim of the first opening 12c of the dust collection case 12. The seal member 20 also seals the gap between the rim of the third opening 8c of the dust-collection housing 8 and the rim of the second opening 12d of the dust collection case 12. The seal member 20 prevents air and dust from leaking through the connecting portion between the dust-collection housing 8 and the dust collection case 12, which is positioned near the inlet port and the outlet port.

The connecting portion that contacts the seal member 20 is located between the lower rim of the second opening 8b of the dust-collection housing 8 and between the upper rim of the first opening 12c of the dust collection case 12. Another connecting portion that contacts the seal member 20 is located between the lower rim of the third opening 8c of the dust-collection housing 8 and the upper rim of the second opening 12d of the dust collection case 12.

The sealed connection of the second opening 8b of the dust-collection housing 8 and the first opening 12c of the dust collection case 12, and the sealed connection of the third opening 8c of the dust-collection housing 8 and the second opening 12d of the dust-collecting case 12 are achieved when the latch part 12b of the dust collection case 12 is engaged in the recess 16a of the tail cover, as described above.

Figure 5:
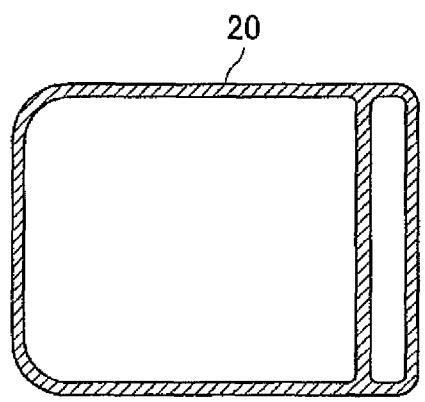
FIG. 5 is a plan view illustrating a sealing member.

As shown in FIG. 5, the seal member 20 has a flat shape. The seal member 20 is a single-piece component. As shown in FIG. 2, the first and second openings 12c and 12d are formed in an upper end of the dust collection case 12 and lie in an imaginary flat plane.

Moreover, the connecting portion between the second opening 8b of the dust-collection housing 8 and the first opening 12c of the dust collection case 12 and the connecting portion between the third opening 8c of the dust-collection housing 8 and the second opening 12d of the dust collection case 12 lie in the same plane.

Figure 6:
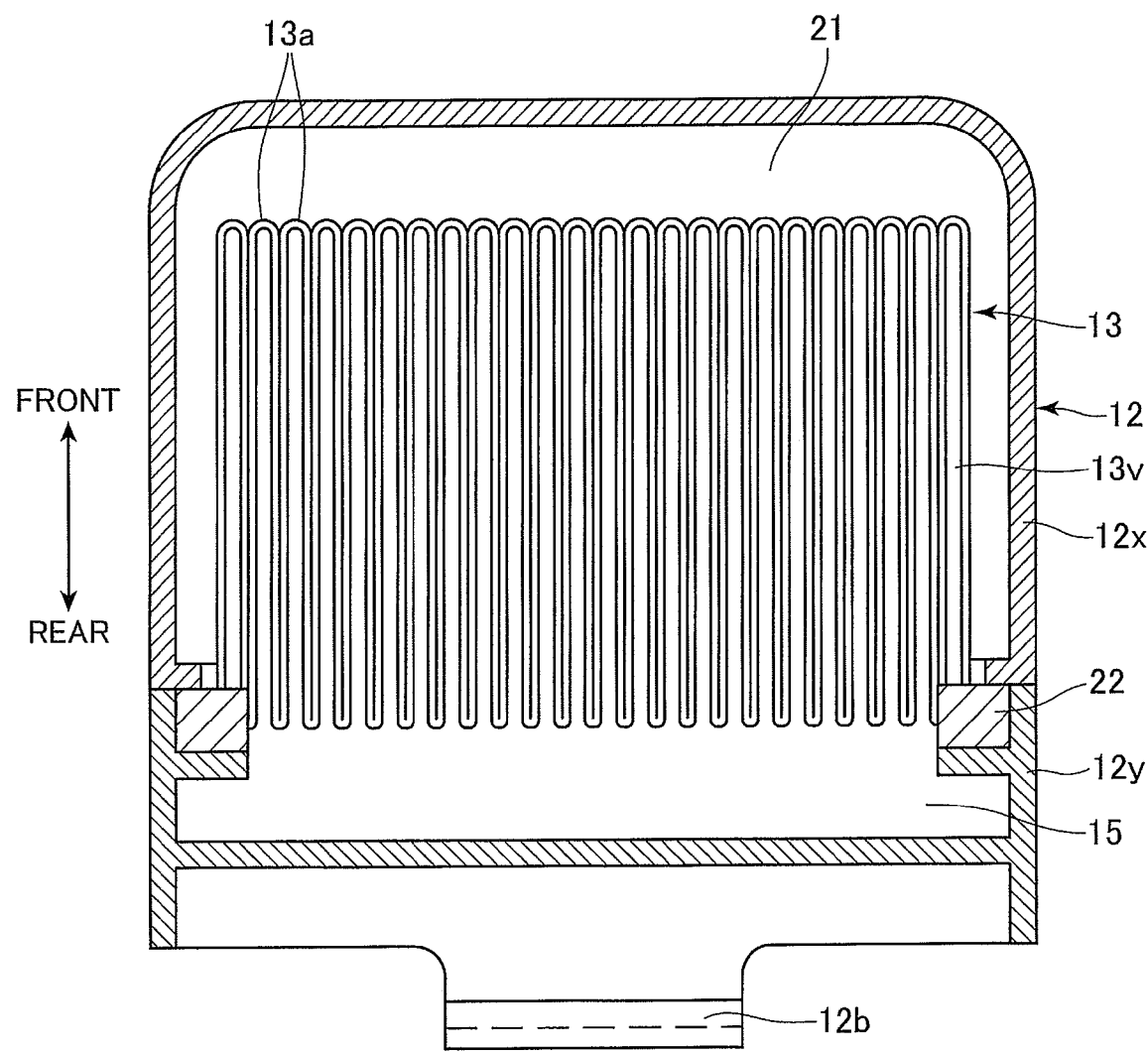
FIG. 6 is a cross section taken along lines A-A shown in FIG. 3.

As shown in FIG. 6, in the dust collection case 12, a filter 13 is provided and fixed in position. In the dust collection case 12, a dust storage unit 21 and an air passage 15 are provided. The filter 13 is provided between the dust storage unit 21 and the air passage 15. Air can flow into the air passage 15 through the filter 13. The filter 13 catches dust, which is collected in the dust storage unit 21.

The detailed structure of the dust collection case 12 will be described.

As shown in FIG. 6, the dust collection case 12 includes a first dust-collection housing 12x and a second dust-collection housing 12y. A filter holder 22 is interposed between the first dust-collection housing 12x and the second dust-collection housing 12y. The filter 13 partitions the interior of the dust collection case 12 into two sections. One section is the dust storage unit 21. The other section is the air passage 15. As shown in FIG. 6, the filter 13 has a number of filter pleats 13a, which extend in the axial direction of the drill tip 26. Each filter pleat 13a has a space 13v, which communicates with the air passage 15. The filter 13 is fixed, at one side, to the filter holder 22. The filter holder 22 is positioned near the junction between the air passage 15 and the dust storage unit 21. The filter holder 22 firmly holds the filter 13, preventing dust from moving into the air passage 15.

Figure 7:
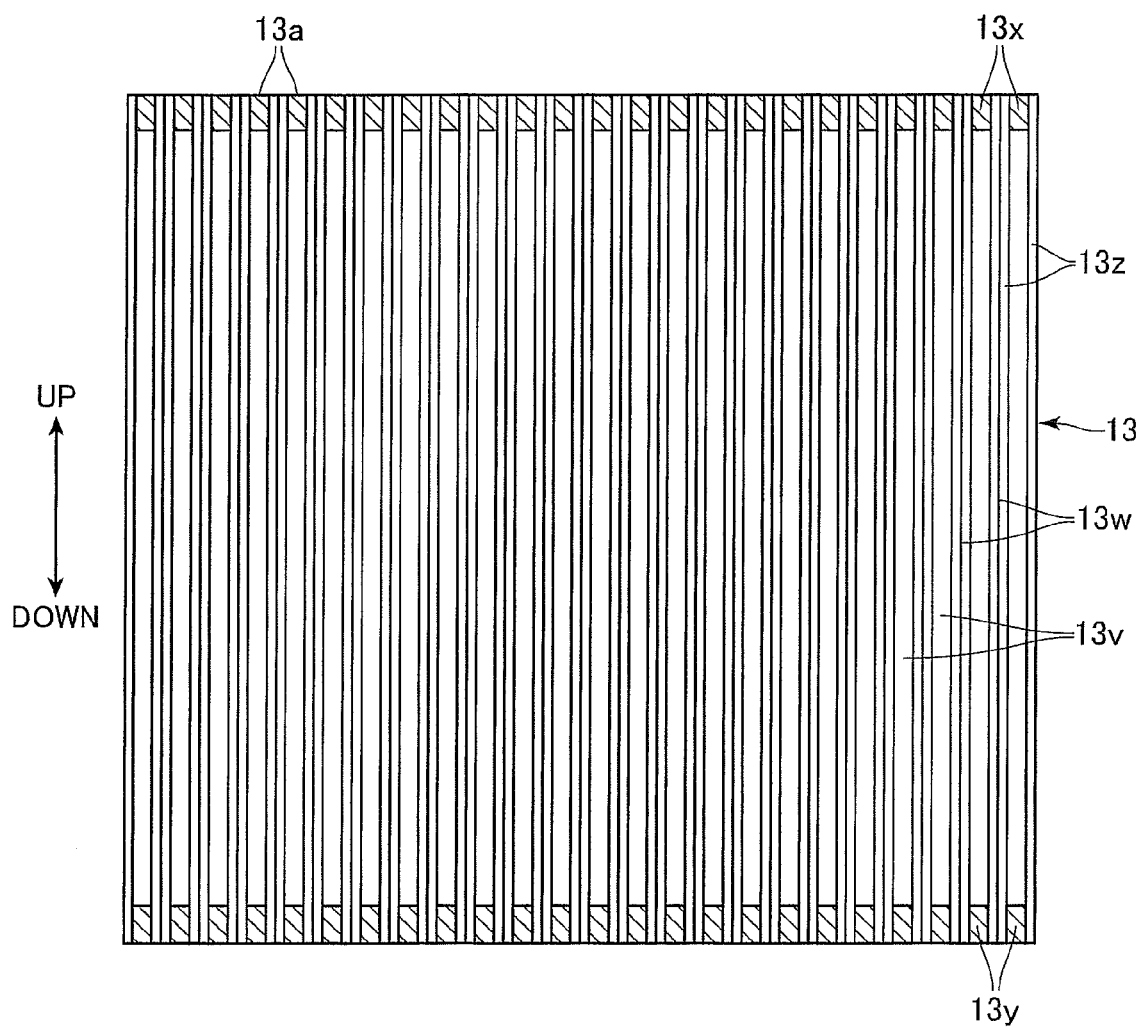
FIG. 7 is a cross section taken along lines B-B shown in FIG. 3.

As shown in FIG. 7, each filter pleat 13a has a top member portion 13x, a bottom member portion 13y and two filter wall portions 13z.

The filter wall portion 13z has an upper end connected to the top member portion 13x and an lower end connected to the bottom member 13y. These connecting portions are achieved by adhesive. Hence, air cannot flow into the air passage 15. As shown in FIG. 7, the space 13v surrounded by each filter pleat 13a communicates with the air passage 15. A gap 13w is provided between the wall portion 13z of one filter pleat 13a and the wall portion 13z of the next filter pleat 13a.

The filter 13 has a large surface area in the dust storage unit 21, because the filter 13 has filter pleats 13a and a narrow gap 13w is provided between any two adjacent filter pleats 13a. In addition, the filter 13 has a large surface area in the air passage 15, because the space 13v in each filter pleat 13a communicates with the air passage 15. Air can flow through a large space, and thus very smoothly, into the air passage 15. This enhances the efficiency of collecting dust.

As shown in FIG. 1, the output axis of the motor 18 is arranged so as to extend at right angles with the longitudinal axis of the drill tip 26. A support member 31 is attached between the drill tip 26 and the motor 18.

The support member 31 includes three hollow cylindrical members. More precisely, the support member 31 has a first slider 31a, a second slider 31b, and a hollow cylindrical member 31c. The hollow cylindrical member 31c is secured to the gear housing 1 and the dust-collection housing 8. The hollow cylindrical member 31c opens at the distal end. The second slider 31b is inserted in the hollow cylindrical member 31c and can slide therein and protrude therefrom. A dust-collection adapter 10 is provided at that end of the first slider 31a, which faces away from the second slider 31b. The first slider 31a and the dust-collection adapter 10 are secured to each other. The closer each hollow cylindrical member is located to the dust-collection adapter 10, the smaller diameter the hollow cylindrical member has. The first slider 31a and the second slider 31b can be moved relative to each other. Since the first slider 31a and the second slider 31b are hollow cylindrical members and one slider is inserted in the other slider, the unit constituted by the sliders 31a and 31b can expand toward and contract from the drill tip 26.

Similarly, the second slider 31b and the hollow cylindrical member 31c can be moved relative to each other. Since the second slider 31b and the hollow cylindrical member 31c are hollow cylindrical members, and one slider 31b is inserted in the other slider 31c, the unit constituted by the second slider 31b and the hollow cylindrical member 31c can expand toward, and can contract from, the drill tip 26. Since the second slider 31b is supported in the hollow cylindrical member 31c, the second slider can slide in the hollow cylindrical member 31c.

Thus, the support member 31 can change in length, or can expand and contract to and from the drill tip 26. The length of the support member 31 in the longitudinal direction of the drill tip 26 is the sum of the length of the hollow cylindrical member 31c, the length of the second slider 31b which protrudes from the hollow cylindrical member 31c, and the length of the first slider 31a which protrudes from the second slider 31b.

The second slider 31b has an opening. The first slider 31a is inserted and can slide in the second slier 31b and protrudes from the opening of the second slider 31b. The first slider 31a, the second slider 31b and the hollow cylindrical member 31c define a continuous passage, in which a spring 32 is inserted. The spring 32 has one end abutting on the bottom of the hollow cylindrical member 31c and the other end abutting on that end of the first slider 31a which is an opposite side of the second slider 31b. The spring 32 biases the first slider 31a to move from the hollow cylindrical member 31c to the dust-collection adapter 10. The dust-collection adapter 10, which is secured to the first slider 31a, is therefore biased to the tip of the drill tip 26.

A dust-collection hose 11 has one end connected to the dust-collection adapter 10 and the other end connected to the first opening 8a of the dust-collection housing 8.

The dust-collection adapter 10 has a hole through which the drill tip 26 can pass. A brush (not shown) is provided in the hole in order to fill the gap between the drill tip 26 and the inner surface of the adapter 10. The brush therefore prevents dust from leaking from the gap between the drill chip 26 and the hole.

The operation of the hammer drill will be described as follows.

The hammer drill can form a hole when the hammer drill is supplied with electric power through the power-supply cord 5. When the user turns on the power switch 3a provided on the handle 3, the motor 18 starts driving the drill tip 26, which results in forming a hole in a workpiece. As the shaft 19 of the motor 18 rotates, the dust-collection fan 14 is driven to rotate, so that the dust generated during the drilling process is moved into the dust collection case 12 through the dust-collection adapter 10, the dust-collection hose 11 and the dust-collection housing 8, as the arrow indicated in FIG. 1.

When the shaft 19 of the motor 18 rotates, the dust-collection fan 14 secured to the shaft 19 rotates. Then, the dust collection fan 14 guides the air together with the dust from the dust-collection adapter 10 in the direction of the arrow shown in FIG. 1. The air containing the dust flows from the dust-collection adapter 10 into the dust-collection hose 11, as the arrow indicated in FIG. 1. Thereafter, the air containing the dust flows through the first opening 8a to the dust-collection housing 8 in the direction of the arrow shown in FIG. 1. Thereafter, the air containing the dust flows from the second opening 8b of the dust-collection housing 8 into the dust collection case 12 through the first opening 12c (shown in FIG. 2) in the direction of the arrow shown in FIG. 1. In the dust collection case 12, the filter 13 removes the dust from the air. At this time, the air containing dust may flow onto the top member portion 13x, or the bottom member portion 13y of each filter pleat 13a. The dust is accumulated in the dust storage unit 21, whereas the air flows through the filter 13 into the air passage 15. From the air passage 15, the air flows through the second opening 12d (shown in FIG. 2) of the dust collection case 12, into the dust-collection housing 8 through the third opening 8c, in the direction of the arrow shown in FIG. 1. Then, the air flown into the dust-collection housing 8 is discharged through the outlet port (not shown) in the dust-collection housing 8.

During the drilling, the user must keep pushing the hammer drill onto the workpiece.

When the hammer drill 100b is pushed onto the workpiece, the tip section 26a of the drill tip 26 cuts the workpiece, forming a hole in the workpiece.

As illustrated in FIG. 1, the dust-collection adapter 10 is positioned closer to the gear housing 1 than to the tip section 26a of the drill tip 26. This is because the drilling has proceeded and the dust-collection adapter 10 has moved closer to the gear housing 1. Thus, the dust-collection adapter 10 is positioned at the position where dust is generated at the surface of the workpiece. Unless the hammer drill is not used, or if the drill is not pushed onto the workpiece, the dust-collection adapter 10 is located near the tip section 26a of the drill tip 26, because the first slider 31a is biased from the hollow cylindrical member 31c to the dust-collection adapter 10.

In the present invention, the spring 32 biases the dust-collection adapter 10 away from the gear housing 1. Hence, the distance between the gear housing 1 and the workpiece gradually decreases as the drilling proceeds. As the tip section 26a of the drill tip 26 cuts the workpiece, the dust-collection adapter 10 is pushed to the gear housing 1 by the workpiece.

As the drilling proceeds, the spring 32 is compressed with the elastic force generated between the gear housing 1 and the workpiece. The support member 31 therefore contracts in the direction away from the drill tip 26. As a result, the support member 31 locates the dust-collection adapter 10 at a position according to the depth of the drill hole.

The spring 32 biases the first slider 31a away from the gear housing 1. As the drilling proceeds, the dust-collection adapter 10 gradually approaches the gear housing 1 because the adapter 10 is secured to the first slider 31a. Once the drilling has proceeded to some extent, the second slider 31b can freely slide.

When the tip section 26a of the drill tip 26 reaches the deepest position in the workpiece, the end of the second slider 31b which is opposite to the gear housing 1 abuts on the dust-collection adapter 10. One end of the hollow cylindrical member 31c which is opposite to the gear housing 1 abuts on the dust-collection adapter 10. Thus, the support member 31 has the length thereof reduced almost to the length of the hollow cylindrical member 31c, when the drilling proceeds so much that the proximal end of the helical section 26b of the drill tip 26 reaches the surface of the workpiece.

To remove the dust collection case 12 from the dust-collection housing 8, as is illustrated in FIG. 2, the latch part 12b of the dust collection case 12 is disengaged from the recess 16a formed in the motor housing 2. In order to disengage the latch part 12b from the recess 16a, a larger force than the force with which the latch part 12b has been engaged in the recess 16a must be applied in the direction of arrow A shown in FIG. 2. When such a force is so applied, the dust collection case 12 is rotated around the projection 12a of the dust collection case 12 that is engaged with the recess 8d of the dust-collection housing 8.

After the latch part 12b has been removed from the recess 16a, the projection 12a of the dust collection case 12 can be disengaged from the recess 8d of the dust-collection housing 8.

A second embodiment of the present invention will be described, with reference to FIG. 3.

Figure 3:
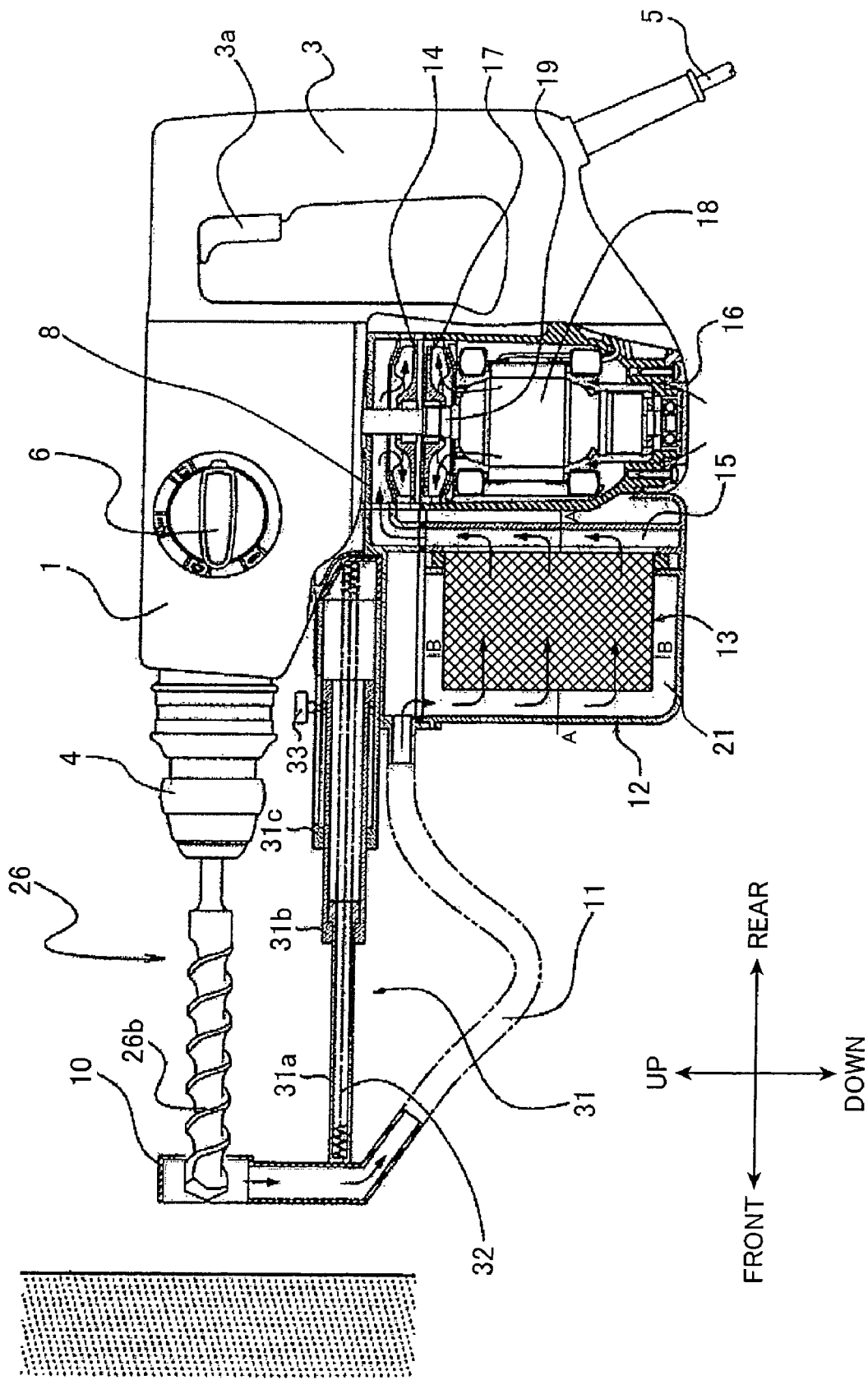
FIG. 3 is a partially sectional view illustrating a hammer drill according to another embodiment of the present invention.

As shown in FIG. 3, a knob 33 is provided in the support member 31. The knob 33 can be configured to adjust the position of the hollow cylindrical member 31c with respect to the dust-collection adapter 10 when the drilling is started.

More specifically, the knob 33 has a screw that extends perpendicular to the axis of the support member 31. The screw is set in engagement with a screw hole cut in the hollow cylindrical member 31c. The lower end of the screw can abut on the second slider 31b which is inserted in the hollow cylindrical member 31c. Because the screw abuts on the second slider 31b, the second slider 31b remains at a specific position with respect to the hollow cylindrical member 31c.

The drill tip 26 of the hammer drill shown in FIG. 3 is shorter than the drill tip 26 shown in FIGS. 1 and 2. In this case, if the drill tip 26 shown in FIGS. 1 and 2 is used, the dust-collection adapter 10 and the support member 31 are pushed to the gear housing 1 for the distance equal to the difference between the drill tip 26 of FIG. 3 and the drill tip shown of FIGS. 1 and 2 in order to position the dust-collection adapter 10 in the vicinity of the tip section 26a, before the drilling is started. Thus, until the adapter 10 is positioned near the tip section 26a, the drilling is not started and no dust-collection process is performed.

To eliminate the necessity of pushing the dust-collection adapter 10 and the support member 31 to the gear housing 1 before starting the drilling, the initial length of the support member 31 can be adjusted by using the knob 33 as shown in FIG. 3.

As shown in FIG. 3, the use of the knob 33 sets the second slider 31b at a specific position with respect to the hollow cylindrical member 31c, thereby shortening the distance for which the adapter 10 may move. In other words, the dust-collection adapter 10 can be positioned near the tip section 26a of the drill tip 26 by the knob 33 at the start of the drilling.

The present invention can provide a drilling device in which the dust-collection adapter can be slidable for a longer distance, the support member does not protrude even if the dust-collection adapter is located near the main unit of the drilling device, and dust can therefore be efficiently collected even if the drill tip is relatively long, and which has a high operating efficiency.

As described above, the spring 32 is provided to bias the support member 31 in the direction in which the dust-collection adapter is away from the main unit of the drilling device 100. The dust-collection adapter 10 can therefore abut on the workpiece and is located near the drilling position. Hence, the present invention can provide a drilling device that can collect dust at high efficiency.

Further, the support member is composed of a plurality of hollow cylindrical members. One hollow cylindrical member, which is closer to the tip end 26a of the drill chip 26, slides in another hollow cylindrical member, which is closer to the gear housing 1. The support member can therefore bear a load over a broad range, which is exerted as one hollow cylindrical member slides in another. Hence, the dust-collection adapter can smoothly move. The drilling device according to this invention can therefore have a higher operating efficiency.

Moreover, the closer each hollow cylindrical member is located to a dust-collection adapter, the smaller diameter the cylindrical member has. Hence, the area in which the hollow cylindrical members slide in one another is smaller near the dust-collection adapter and is larger remote from the adapter. The load is therefore appropriately exerted on all hollow cylindrical members when each member slides in another. Hence, the drilling device can acquire a long lifetime.

Since the spring 32 is arranged in the hollow cylindrical members, the spring does not contact any other components than the cylindrical members. Therefore, a deformation caused by the spring 32 is restricted at all.

As described above, the support member 31 is composed of a plurality of members 32a, 31b and 31c. Of these members, one member, which is closer to the tip end 26a of the drill chip 26, can slide in the adjacent one, which is closer to the gear housing 1. At least one member 31c has the restricting mechanism 33 for restricting the sliding distance. Hence, the slidable distance of the dust-collection adapter 10 can be limited, thereby restricting the depth of the hole in the workpiece formed by the drilling device 100.

The output axis of the motor is positioned at right angles with the longitudinal axis of the drill tip 26, and the support member 31 is provided between the drill tip and the motor. This structure serves to downsize the drilling device in the drilling direction. The probability that the support member contacts any other members therefore decreases, ultimately increasing the operating efficiency of the drilling device.

In the present invention, the dust collection case has an inlet port through which air and dust may flow into the case, and an outlet port through which air may flow from the case. Since these ports are oriented in a single direction, the dust collection case 12 can be attached to the dust-collection housing 8 if the dust collection case is moved to the housing 8 in one direction. Thus, the dust collection case 12 can be attached to the dust-collection housing 8 in a single manner.

Moreover, the inlet port and the outlet port are provided in the same plane. The dust collection case 12 can therefore be attached to the dust-collection housing 8 in an easier manner than before.

As the drill tip moves back and forth and strikes the workpiece, the hammer drill is vibrated due to the reaction the drill receives from the workpiece. The air containing dust is prevented from leaking in spite of the vibration of the hammer drill, because the flat seal member between the dust-collection housing and the dust-collection case is located in a direction parallel to the direction in which the drill tip moves back and forth.

The inlet port is formed in the top surface of the dust-collection case as described above. Therefore, the dust does not leak from the dust collection case when the user detaches the dust collection case from the dust collection housing 8.

The seal member for both the inlet port and the outlet port is made from a single component. Therefore, the seal member contributes to manufacturing a drilling device having a simple configuration at a lower price with ease.

In the present invention, the dust collection case is supported to the dust collection housing 8 with engaging portions 12a, 12b positioned on an imaginary line passing through the center of gravity of the dust collection case 12. The vibration of dust collection case is suppressed, while the drilling device is performing drilling and is inevitably vibrating. This structure suppresses the leak of dust from the dust collection case and an accidental removal of the dust collection case from the dust collection housing.

In another embodiment, electric power may be supplied from a battery to the drilling device.

In another embodiment, the hollow cylindrical member 31c may be detachable from the gear housing 1 and the dust-collection housing 8. Alternatively, the member 31c may be detachable from either one of the gear housing 1 and the dust-collection housing 8.

In another embodiment, the first slider 31a may slide on the outer surface of the second slider 31b. The second slider 31b may slide on the outer surface of the hollow cylindrical member 31c.

In another embodiment, the first opening 12c and the second opening 12d may be formed in one side surface of the dust collection case 12 in order that the openings are oriented in the single direction.

In another embodiment, the dust-collection hose 11 may be provided in the support member 31.

In the embodiment described above, the dust collection case 12 is attached to the dust collection case when the latch part 12b of the dust collection case 12 is engaged in the recess 16a of the tail cover and the projection 12a of the dust collection case 12 is engaged in the recess 8d of the dust-collection housing 8. However, any structure for attaching the dust collection case 12 to the dust collection housing 8 other than the described above can be adopted.

In another embodiment, the support member 31 may be composed of hollow members, having any other cross section such as a triangular one, a rectangular one or a keyhole-shaped one.

It is understood that the foregoing description and accompanying drawings set forth the embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A drilling device, comprising:
   an end cutting tool for processing a workpiece;
   a motor housing;
   a motor provided in the motor housing for generating a torque and having a shaft on which a fan is mounted;
   a transmission for transmitting the torque to rotate the end cutting tool; and
   a dust collection unit for collecting dust generated by the rotation of the end cutting tool, the dust collection unit comprising a dust case for accumulating the dust therein, the dust case being disposed adjacent to the motor housing and being detachable from the motor housing and having an inlet and an outlet, and the inlet and the outlet being oriented in a direction parallel to the shaft of the motor.

2. The drilling device as claimed in claim 1, wherein the dust case has a flat face, and the inlet and the outlet are provided on the flat face to be flush with each other.

3. The drilling device as claimed in claim 2, further comprising
   an impact mechanism for reciprocating the end cutting tool in a reciprocation direction, the reciprocation direction being parallel to the flat face.

4. The drilling device as claimed in claim 1, wherein the inlet is provided in an upper portion of the dust collection case.

5. The drilling device as claimed in claim 1, further comprising a single sealing member
   provided surrounding edges of the inlet and the outlet.

6. A drilling device, comprising:
   an end cutting tool for processing a workpiece;
   a motor housing;
   a motor having a rotation shaft and disposed in the motor housing for generating a torque;
   a transmission means for transmitting the torque of the motor to rotate the end cutting tool; and
   a dust collection unit for collecting dust generated by the rotation of the end cutting tool, the dust collection unit comprising
   a dust-collection housing disposed extending in a direction perpendicular to the motor shaft and having a flat surface in which a first and a second openings are formed;
   a dust collection fan disposed in the dust-collection housing and mounted on the shaft of the motor to introduce air into the dust-collection housing; and
   a dust collection case storing a filter for accumulating the dust therein, the dust collection case being disposed adjacent to the motor housing and extending in a direction parallel to the shaft of the motor, the dust collection case being detachable from the motor housing and the dust collection housing and having an inlet port and an outlet port which are formed in a flat surface and disposed to communicate with the first and the second openings of the dust-collection housing respectively.

7. The drilling device according to claim 6, wherein the dust collection case is provided with a first protrusion which is engaged with the dust-collection housing and a second protrusion which is engaged with the motor housing.

8. The drilling device according to claim 7, wherein the first projection and the second projection are provided on an imaginary line passing through a center of gravity of the dust collection case.

9. The drilling device as claimed in claim 6, which further comprises an impact mechanism for reciprocating the end cutting tool in a direction perpendicular to the shaft of the motor and parallel to the flat surface of the dust collection case.

10. The drilling device as claimed in claim 6, wherein the inlet port and the outlet port are provided in an upper portion of the dust collection case.

11. A drilling device, comprising:

an end cutting tool for processing a workpiece;

a motor housing;

a motor provided in the motor housing for generating a torque;

a transmission for transmitting the torque to rotate the end cutting tool; and a dust collection unit for collecting dust generated by the rotation of the end cutting tool, the dust collection unit comprising a dust case for accumulating the dust therein, the dust case being detachable from the motor housing and having an inlet and an outlet, and the inlet and the outlet being oriented in a single face of the dust case.

* * * * *